(12) United States Patent
Corbat et al.

(10) Patent No.: US 8,776,559 B2
(45) Date of Patent: Jul. 15, 2014

(54) SECURITY DEVICE FOR A POWER TOOL ACCESSORY

(71) Applicant: Milwaukee Electric Tool Corporation, Brookfield, WI (US)

(72) Inventors: Jeffrey Corbat, Racine, WI (US); Thaddeus H. Feiler, Wauwatosa, WI (US); Todd Taylor, West Bend, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 13/945,584

(22) Filed: Jul. 18, 2013

(65) Prior Publication Data

US 2014/0020434 A1 Jan. 23, 2014

Related U.S. Application Data

(60) Provisional application No. 61/673,118, filed on Jul. 18, 2012.

(51) Int. Cl.
*E05B 65/00* (2006.01)

(52) U.S. Cl.
USPC ............. 70/57.1; 206/308.1; 70/416; 70/455; 70/423

(58) Field of Classification Search
USPC ......... 70/57.1, 416, 423, 424, 455; 206/308.1
See application file for complete search history.

(56) References Cited

U.S. PATENT DOCUMENTS

| 1,839,798 | A | * | 1/1932 | Meader | 411/372.5 |
|---|---|---|---|---|---|
| 3,279,838 | A | * | 10/1966 | Hamilton | 292/251 |
| 3,861,182 | A | * | 1/1975 | Skinner | 70/455 |
| 4,073,165 | A | * | 2/1978 | Grundstrom et al. | 70/37 |
| 4,676,084 | A | * | 6/1987 | Signorelli | 70/440 |
| 5,205,144 | A | * | 4/1993 | Montano | 70/455 |
| 5,428,875 | A | * | 7/1995 | Nguyen et al. | 24/704.1 |
| 5,746,078 | A | * | 5/1998 | Kiernan | 70/424 |
| 6,675,962 | B2 | * | 1/2004 | Myszka et al. | 206/308.2 |
| 7,140,489 | B2 | * | 11/2006 | Lax et al. | 206/308.2 |
| D627,216 | S | * | 11/2010 | Fulginiti | D8/499 |
| 8,035,518 | B2 | * | 10/2011 | Kolton et al. | 340/572.1 |
| 2007/0158217 | A9 | * | 7/2007 | Myszka et al. | 206/308.2 |

* cited by examiner

*Primary Examiner* — Suzanne Barrett
(74) *Attorney, Agent, or Firm* — Michael Best & Friedrich LLP

(57) ABSTRACT

A security assembly is configured for attachment to a hole saw having a cap defining a central mounting aperture. The security assembly includes a substantially cylindrical base portion having a central axis. A handle portion is coupled to the cylindrical base portion and defines a tag cavity for housing a security tag. An extension member extends opposite the handle portion from the base portion along the central axis. The extension member engages the central mounting aperture of the hole saw.

16 Claims, 5 Drawing Sheets

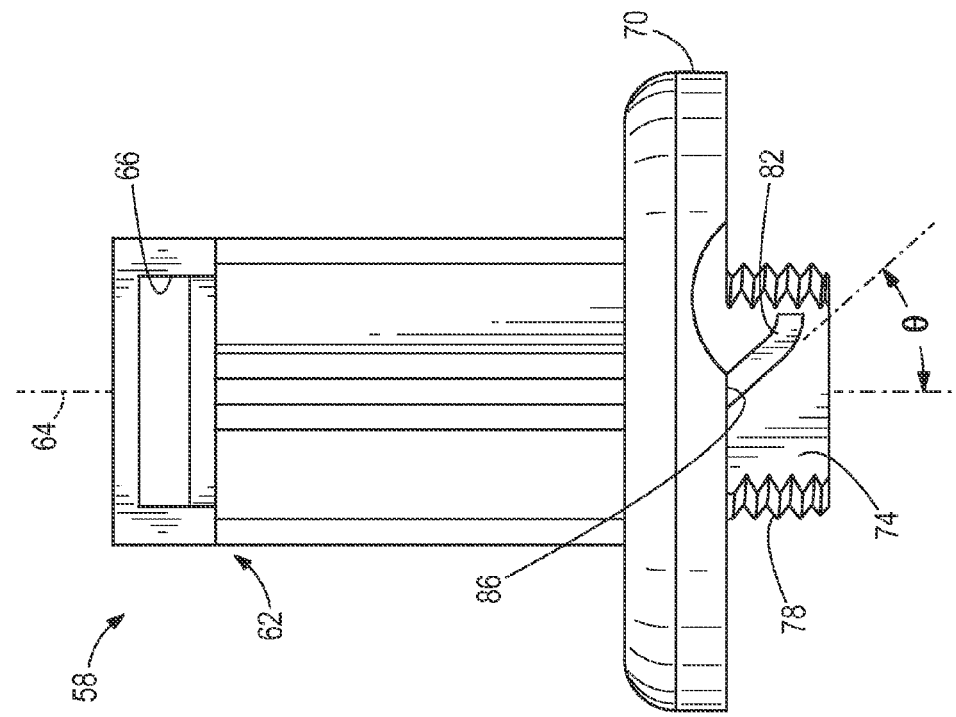
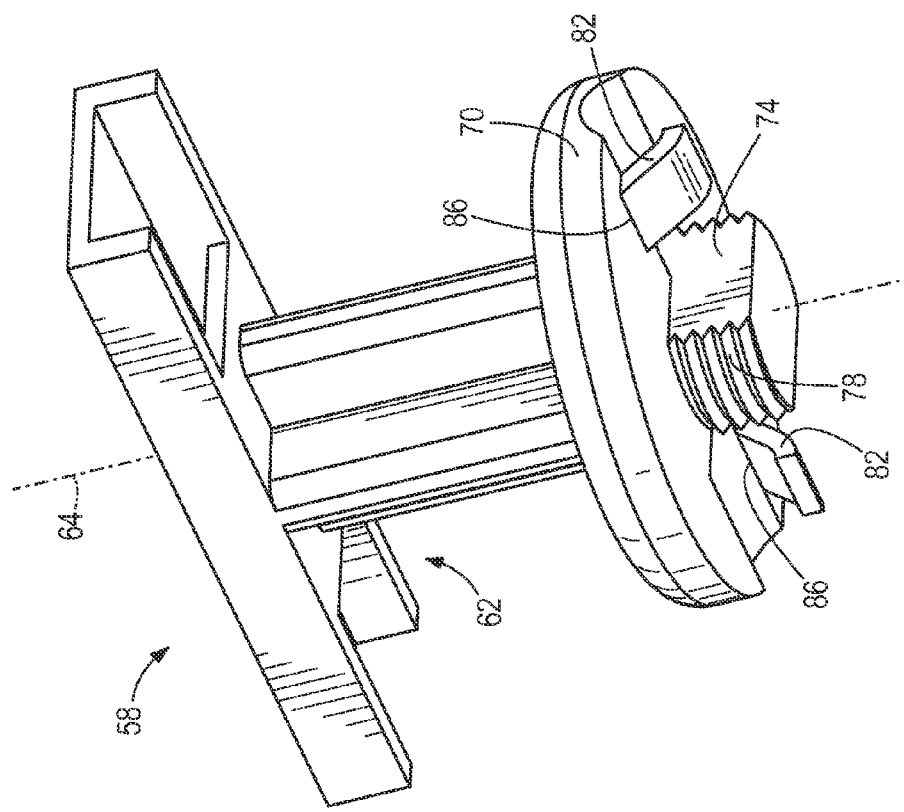
FIG. 3
FIG. 2

US 8,776,559 B2

SECURITY DEVICE FOR A POWER TOOL ACCESSORY

CROSS-REFERENCE TO RELATED APPLICATION

This application claims priority to U.S. Provisional Patent Application No. 61/673,118, filed Jul. 18, 2012, the entire contents of which are herein incorporated by reference.

BACKGROUND

The present invention relates to power tool accessories, and more particularly to a point of purchase security device for power tool accessories.

Power tool accessories, such as hole-saws, may be displayed at a point of purchase with minimal packaging. The minimal packaging and compactness of the accessories makes them susceptible to shop-lifting.

SUMMARY

In one embodiment, the invention provides a security assembly for attachment to a hole saw having a cap defining a central mounting aperture. The security assembly includes a substantially cylindrical base portion having a central axis. A handle portion is coupled to the cylindrical base portion and defines a tag cavity for housing a security tag. An extension member extends opposite the handle portion from the base portion along the central axis. The extension member engages the central mounting aperture of the hole saw.

In another embodiment the invention provides a security assembly for attachment to a hole saw having a cap defining a central mounting aperture and a hole defined in the cap adjacent the mounting aperture. The security assembly includes a substantially cylindrical base portion having a central axis. A handle portion is coupled to the cylindrical base portion and defines a tag cavity adapted to house a security tag. An extension member extends axially from the base portion, opposite the handle portion. The extension member engages the mounting aperture of the hole saw. A retention member extends from the base portion adjacent the extension member. The retention member is configured to engage the hole.

Other aspects of the invention will become apparent by consideration of the detailed description and accompanying drawings.

BRIEF DESCRIPTION OF THE DRAWINGS

FIG. 2 is a perspective view of a security assembly according to a first embodiment of the invention.

FIG. 3 is a side view of the security assembly of FIG. 2.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
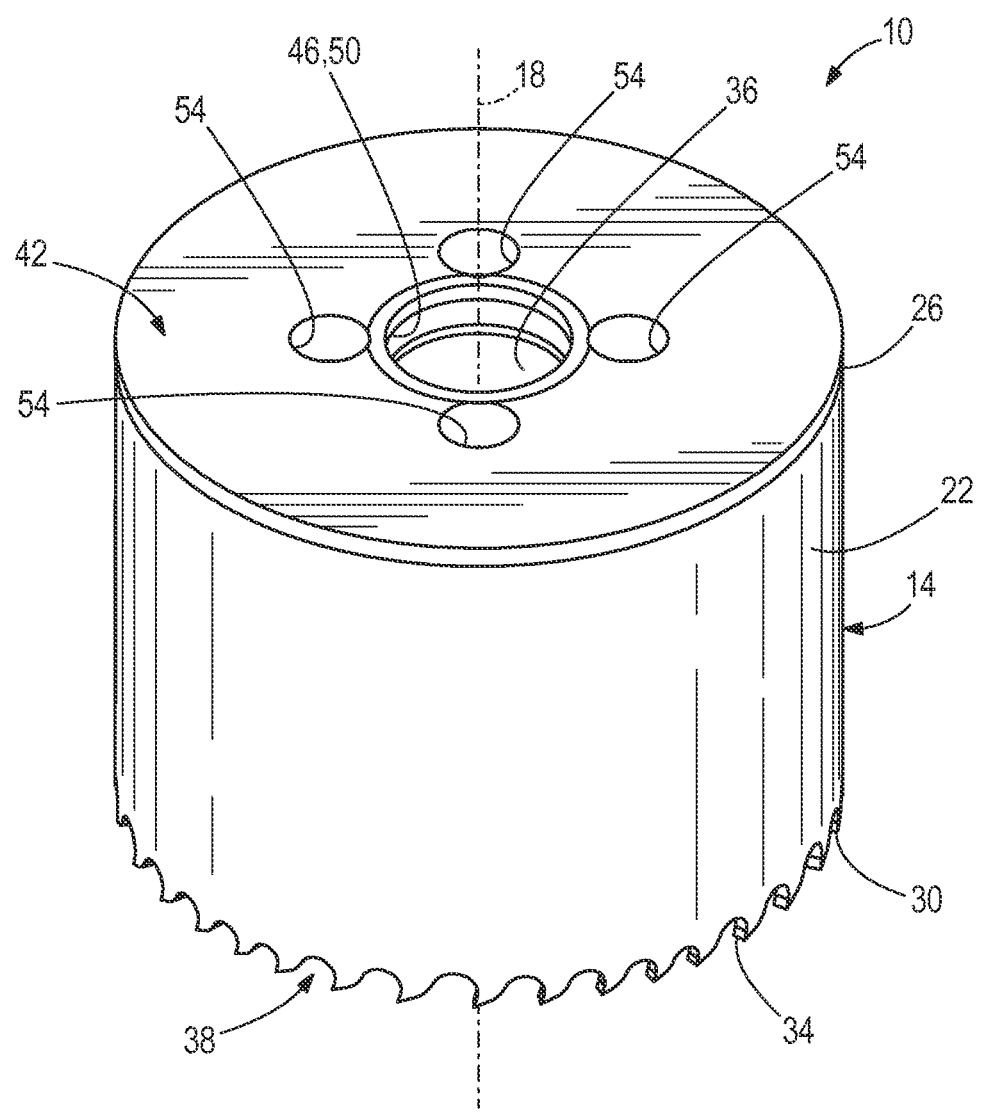
FIG. 1 is a perspective view of a hole saw.

FIG. 1 is a perspective view of a hole saw 10. The hole saw 10 includes a cylindrical body 14 disposed along an axis of rotation 18. The cylindrical body 14 is defined by a side wall 22 that extends between a cap end 26 and a cutting end 30. The cutting end 30 includes cutting teeth 34. An inner wall 36 of the cylindrical body defines a cavity 38 for receiving workpiece plugs.

A cap 42 is coupled to the cap end 26 of the cylindrical body 14. The cap 42 defines a mounting aperture 46 centered about the axis 18 and configured to receive a mandrel or equivalent tool (not shown). The mounting aperture 46 defines internal threads 50. Torque transmission holes 54 are defined in the cap 42 and are circumferentially arranged about the mounting aperture 46.

FIGS. 2 and 3 illustrate a security assembly 58 that is configured to engage the cap 42 of the hole saw 10 of FIG. 1. The security assembly 58 includes a T-shaped handle portion 62 oriented along an axis 64. The handle portion 62 defines a tag cavity 66 (FIG. 3) oriented substantially perpendicular to the axis 64. The tag cavity 66 is a recess formed in the handle portion 62 and sized to accommodate a security tag or electronic article surveillance (EAS) label, such as a Sensormatic® Ultra-Strip® label (not shown). The dimensions of the tag cavity 66 may be tailored to suit the particular security tag or EAS label intended for use in the security assembly.

The handle portion 62 is coupled to a substantially cylindrical base portion 70. Referring to FIG. 2, an extension member 74 extends along axis 64 from the base portion 70, opposite the handle portion 62. The extension member 74 is configured to engage the mounting aperture 46 of the hole saw 10 (FIG. 1). More specifically, the extension member 74 includes external threads 78 to engage the internal threads 50 of the hole saw mounting aperture 46 (FIG. 1).

Two retention members, more specifically retention tabs 82 extend from the base portion 70 adjacent the extension member 74. A resilient hinge 86 is defined between each retention tab 82 and the base portion 70. Referring to FIG. 3, the hinge 86 resiliently suspends the retention tab 82 at an acute angle θ relative to the axis 64. Each retention tab 82 is configured to engage a respective torque transmission hole 54 of the hole saw cap 42. Due to the resilient hinge 86 and the angle θ of the retention tabs, the retention tabs 82 may pass over the torque transmission holes 54 (FIG. 1) as the extension member 74 is threaded into the mounting aperture 46. However, the angle θ of the retention tabs 82 substantially inhibits the security assembly 58 from disconnecting from the hole saw 10 if one attempts to unscrew the extension member 74 from the mounting aperture 46.

The security assembly 58 may be unitarily formed, such that the handle portion 62, base portion 70, extension member 74, and retention tabs 82 are injection molded as a single piece of polymer material. Accordingly, the hinge 86 is of the type commonly referred to as a "living hinge." The security assembly 58 may be molded from ABS, acrylic, nylon, polycarbonate, polypropylene, PVC, or other suitable material. In further embodiments, the security assembly 58 may be molded from a fiber reinforced material. In still further embodiments, the security assembly 58 may be molded from a biopolymer, or a natural fiber reinforced biocomposite material.

Figure 4:
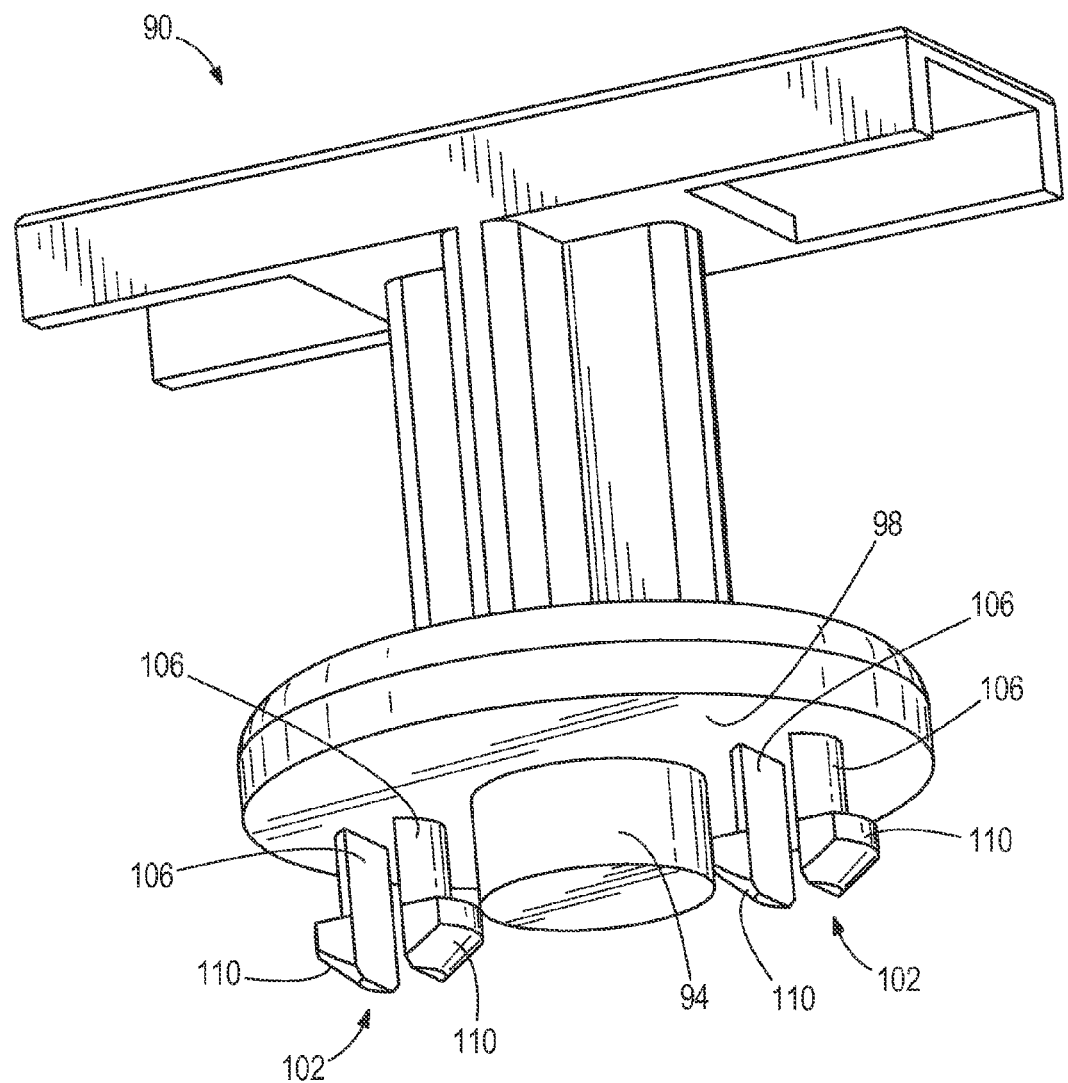
FIG. 4 is a perspective of a security assembly according to a second embodiment of the invention.

FIG. 4 illustrates a security assembly 90 according to another embodiment of the invention. The security assembly 90 shares many similarities to the security assembly 58 of FIG. 2-3, and only those aspects that differ will be described herein.

The security assembly 90 includes a substantially cylindrical extension member 94 extending from a base portion 98. Two retention member assemblies, more specifically snap assemblies 102 extend from the base portion 98 adjacent the extension member 94. Each snap assembly 102 includes a pair of spaced-apart resilient arm members 106. A distal end of each arm member 106 defines a tapered flange 110.

With references to FIGS. 1 and 4, when the security assembly 90 is coupled to the hole saw 10 along the axis 18, the cylindrical extension member 94 is slidingly received within the mounting aperture 46. The snap assemblies 102 align with opposing torque transmission holes 54. When the tapered flange 110 of each arm member 106 contacts the cap 42, the arm members 106 are deflected inwardly until the snap assembly 102 may pass through the torque transmission hole 54. Once the flanges 110 have passed completely through the cap 42, the arm members 106 deflect outwardly to a static position (as shown in FIG. 4) and the flanges substantially fasten the security assembly 90 to the hole saw 10.

Figure 5:
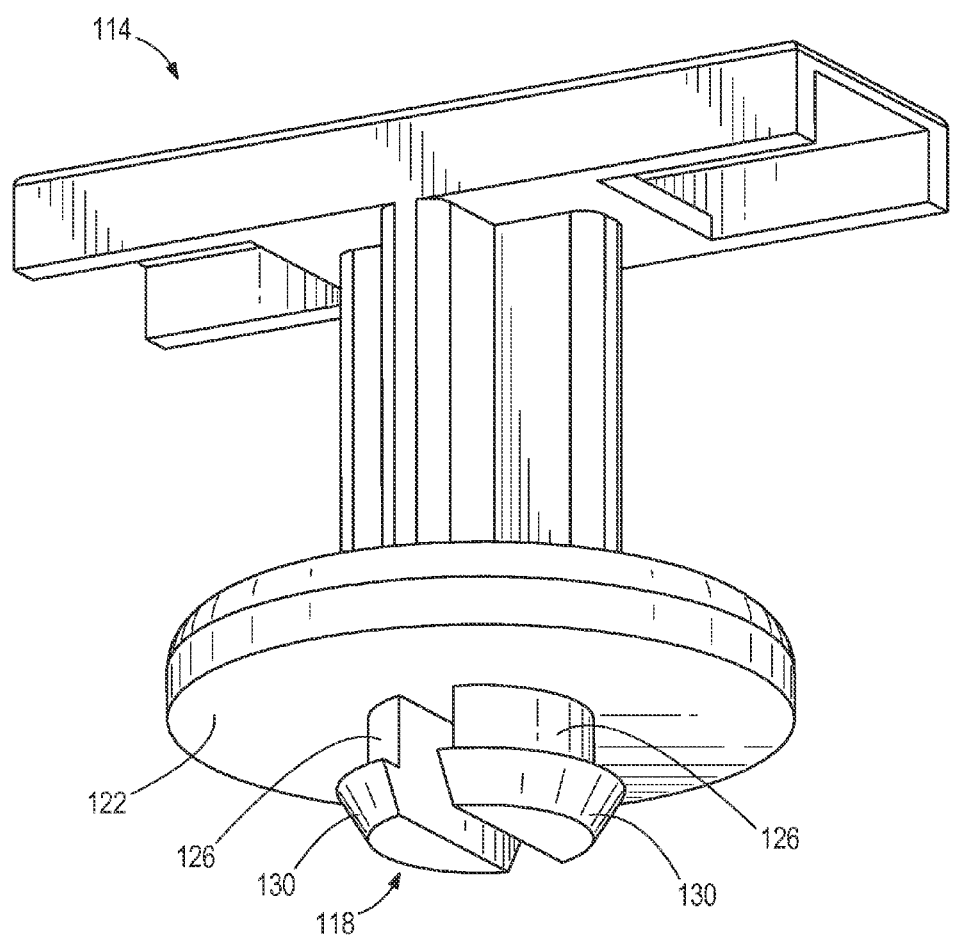
FIG. 5 is a perspective view of a security assembly according to a third embodiment of the invention.

FIG. 5 illustrates a security assembly 114 according to yet another embodiment of the invention. The security assembly 114 shares many similarities to the security assembly 58 of FIGS. 2-3, and only those aspects that differ will be described herein.

The security assembly 114 includes a central snap assembly 118 that extends distally from a base portion 122. The snap assembly 118 includes a pair of spaced-apart resilient arm members 126. A distal end of each arm member 126 defines a tapered flange 130. With reference to FIGS. 1 and 5, when the security assembly 114 is coupled to the hole saw 10 along the axis 18, the snap assembly 118 aligns with the mounting aperture 46. When the tapered flange 130 of each arm member 126 contacts the cap 42, the arm members 126 deflected inwardly until the snap assembly 118 passes through the mounting aperture 46. Once the flanges 130 have passed completely through the cap 42, the arm members 126 deflect outwardly to a static position (as shown in FIG. 5) and the flanges 130 substantially fasten the security assembly 114 to the hole saw 10.

Figure 6:
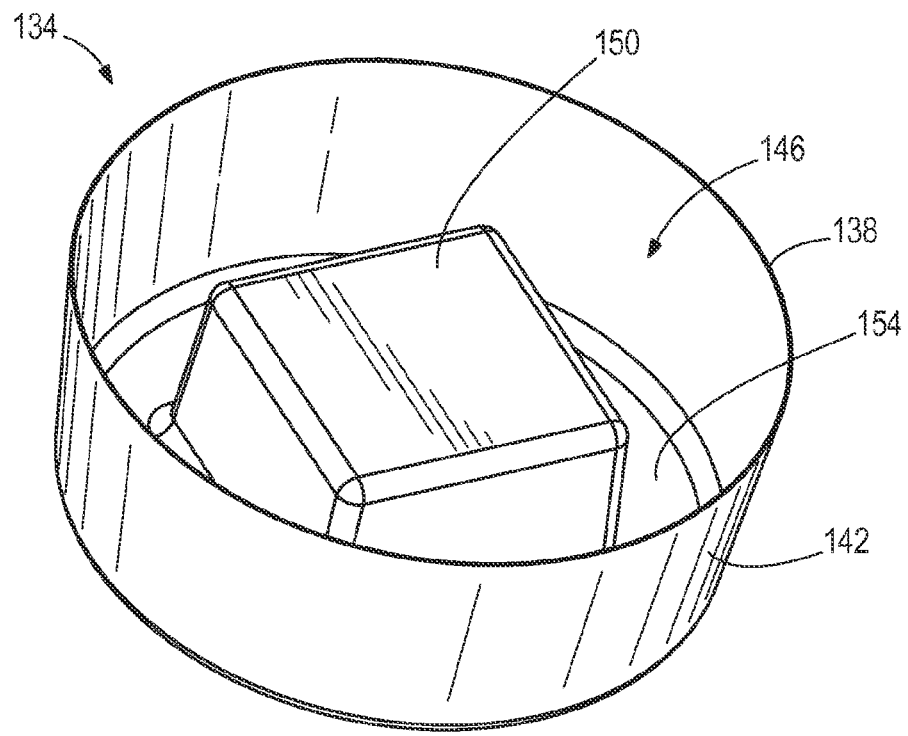
FIG. 6 is a perspective view of a security assembly according to a fourth embodiment of the invention.
Figure 7:
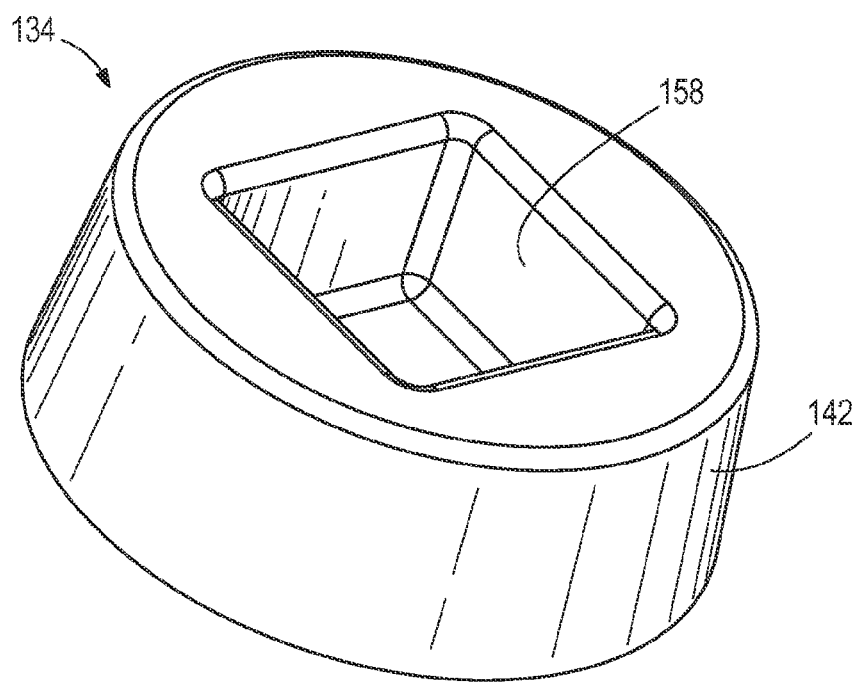
FIG. 7 is an alternative perspective view of the security assembly of FIG. 6.

FIGS. 6-7 illustrate a security assembly 134 according to still yet another embodiment of the invention. The security assembly 134 includes a body 138 with a tapered outer surface 142. The outer surface 142 engages the inside surface 36 of the hole saw 10 (FIG. 1). The taper facilitates the use of the security assembly 134 with hole saws having a range of inside diameters.

The body 138 defines a cup-like recess 146. A security tag housing 150 is disposed at a base portion 154 of the recess 146. The security tag housing 150 defines a security tag receptacle 158 (FIG. 7). The security tag receptacle 158 is sized to receive the aforementioned security tag or EAS. The dimensions of the tag receptacle 158 may be tailored to suit the particular EAS label intended for use. When the security assembly is disposed within the cavity 38 of the hole saw 10 (FIG. 1), the security tag is captured between the security tag receptacle 158 and the cap 42.

The security assembly 134 may be unitarily formed, such that the body 138 and security tag housing 150 are injection molded as a single piece of polymer material. The security assembly 134 may be molded from ABS, acrylic, nylon, polycarbonate, polypropylene, PVC, or other suitable material. In further embodiments, the security assembly 134 may be molded from a fiber reinforced material. In still further embodiments, the security assembly 134 may be molded from a biopolymer, or a natural fiber reinforced biocomposite material.

Thus, the invention provides, among other things, a security device for a power tool accessory. Various features and advantages of the invention are set forth in the following claims.

What is claimed is:

1. A security assembly for attachment to a hole saw having a cap defining a central mounting aperture, the security assembly comprising:
   a substantially cylindrical base portion having a central axis;
   a handle portion coupled to the cylindrical base portion and defining a tag cavity for housing a security tag;
   an extension member extending opposite the handle portion from the base portion along the central axis, the extension member for engaging the central mounting aperture of the hole saw; and
   a retention tab extending from the base portion adjacent the extension member, the retention tab engageable with a hole defined in the cap adjacent the mounting aperture, thereby inhibiting removal of the security assembly from the hole saw;
   wherein the retention tab and the base portion are integrally formed as one piece, and further wherein a living hinge is defined between the retention tab and the base portion.

2. The security assembly of claim 1, wherein the retention tab extends from the base portion at an acute angle with respect to the central axis.

3. The security assembly of claim 1, wherein the retention tab is resiliently suspended from the base portion.

4. A security assembly for attachment to a hole saw having a cap defining a central mounting aperture, the security assembly comprising:
   a substantially cylindrical base portion having a central axis;
   a handle portion coupled to the cylindrical base portion and defining a tag cavity for housing a security tag;
   an extension member extending opposite the handle portion from the base portion along the central axis, the extension member for engaging the central mounting aperture of the hole saw; and
   a first retention tab extending from the base portion adjacent the extension member for engaging a first hole defined in the cap, and a second retention tab extending from the base portion adjacent the extension member for engaging a second hole defined in the cap.

5. A security assembly for attachment to a hole saw having a cap defining a central mounting aperture, the security assembly comprising:
   a substantially cylindrical base portion having a central axis;
   a handle portion coupled to the cylindrical base portion and defining a tag cavity for housing a security tag; and
   an extension member extending opposite the handle portion from the base portion along the central axis, the extension member for engaging the central mounting aperture of the hole saw;
   wherein the extension member includes external threads for engaging internal threads of the mounting aperture.

6. A security assembly for attachment to a hole saw having a cap defining a central mounting aperture, the security assembly comprising:
   a substantially cylindrical base portion having a central axis;

a handle portion coupled to the cylindrical base portion and defining a tag cavity for housing a security tag;

an extension member extending opposite the handle portion from the base portion along the central axis, the extension member for engaging the central mounting aperture of the hole saw; and at least one snap assembly extending from the base portion adjacent the extension member, the snap assembly engaging a hole defined in the cap to inhibit removal of the security assembly from the hole saw.

7. The security assembly of claim 6, wherein the snap assembly includes a pair of spaced-apart, resilient arm members.

8. The security assembly of claim 7, wherein a distal end of each arm member defines a tapered flange for fastening the security assembly to the hole saw.

9. The security assembly of claim 1, wherein the handle portion extends from the base portion along the central axis.

10. A security assembly for attachment to a hole saw having a cap defining a central mounting aperture and a hole defined in the cap adjacent the mounting aperture, the security assembly comprising:

a substantially cylindrical base portion having a central axis;

a handle portion coupled to the cylindrical base portion and defining a tag cavity adapted to house a security tag;

an extension member extending axially from the base portion, opposite the handle portion, the extension member configured to engage the mounting aperture of the hole saw; and a retention member extending from the base portion adjacent the extension member, the retention member configured to engage the hole;

wherein the retention member and the base portion are integrally formed as one piece, and further wherein a living hinge is defined between the retention member and the base portion.

11. The security assembly of claim 10, wherein the retention member extends from the base portion adjacent the extension member.

12. The security assembly of claim 10, wherein the retention member extends from the base portion at an acute angle with respect to the central axis.

13. The security assembly of claim 10, wherein the retention member is resiliently suspended from the base portion.

14. A security assembly for attachment to a hole saw having a cap defining a central mounting aperture and a hole defined in the cap adjacent the mounting aperture, the security assembly comprising:

a substantially cylindrical base portion having a central axis;

a handle portion coupled to the cylindrical base portion and defining a tag cavity adapted to house a security tag;

an extension member extending axially from the base portion, opposite the handle portion, the extension member configured to engage the mounting aperture of the hole saw; and a retention member extending from the base portion adjacent the extension member, the retention member configured to engage the hole;

wherein the extension member includes external threads for engaging internal threads of the mounting aperture.

15. A security assembly for attachment to a hole saw having a cap defining a central mounting aperture and a hole defined in the cap adjacent the mounting aperture, the security assembly comprising:

a substantially cylindrical base portion having a central axis;

a handle portion coupled to the cylindrical base portion and defining a tag cavity adapted to house a security tag;

an extension member extending axially from the base portion, opposite the handle portion, the extension member configured to engage the mounting aperture of the hole saw; and a retention member extending from the base portion adjacent the extension member, the retention member configured to engage the hole;

wherein the retention member comprises at least one snap assembly extending from the base portion adjacent the extension member, the snap assembly engaging the hole to inhibit removal of the security assembly from the hole saw.

16. The security assembly of claim 15, wherein the snap assembly includes a pair of spaced-apart, resilient arm members, each arm member defining a tapered flange for fastening the security assembly to the cap.

* * * * *